US011900258B2

(12) United States Patent
Ono

(10) Patent No.: US 11,900,258 B2
(45) Date of Patent: Feb. 13, 2024

(54) LEARNING DEVICE, IMAGE GENERATING DEVICE, LEARNING METHOD, IMAGE GENERATING METHOD, AND PROGRAM

(71) Applicant: SONY INTERACTIVE ENTERTAINMENT INC., Tokyo (JP)

(72) Inventor: Daichi Ono, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 676 days.

(21) Appl. No.: 17/052,599

(22) PCT Filed: May 23, 2018

(86) PCT No.: PCT/JP2018/019853
§ 371 (c)(1),
(2) Date: Nov. 3, 2020

(87) PCT Pub. No.: WO2019/224947
PCT Pub. Date: Nov. 28, 2019

(65) Prior Publication Data
US 2021/0158482 A1    May 27, 2021

(51) Int. Cl.
*G06N 3/084* (2023.01)
*G06N 20/00* (2019.01)
(Continued)

(52) U.S. Cl.
CPC ........... *G06N 3/084* (2013.01); *G06F 18/214* (2023.01); *G06F 18/2163* (2023.01);
(Continued)

(58) Field of Classification Search
CPC .... G06V 10/82; G06V 10/764; G06V 10/454; G06V 30/274; G06N 3/045; G06N 3/08;
(Continued)

(56) References Cited

U.S. PATENT DOCUMENTS

2014/0267587 A1* 9/2014 Arcas ................... H04N 23/698
348/36
2015/0134651 A1* 5/2015 Holzer ................ G06F 16/5838
707/723
(Continued)

FOREIGN PATENT DOCUMENTS

JP    2006-209396 A    8/2006
JP    2011-138314 A    7/2011
(Continued)

OTHER PUBLICATIONS

International Search Report and Written Opinion dated Jun. 26, 2018, from PCT/JP2018/019853, 9 sheets.
(Continued)

*Primary Examiner* — Ian L Lemieux
*Assistant Examiner* — Woo C Rhim
(74) *Attorney, Agent, or Firm* — XSENSUS LLP

(57) ABSTRACT

A learning device, an image generating device, a learning method, an image generating method, and a program are provided which can improve accuracy of estimation of an environment outside an angle of view of an image input to an image generating section. A second learning data obtaining section (64) obtains an input image. A second learning section (66) obtains result data indicating a result of execution of semantic segmentation on the input image. An input data generating section (38) generates input data obtained by coupling the input image and the result data to each other. By using the input data as input, the second learning section (66) performs learning of a wide view angle image generating section (28) that generates, in response to input of data obtained by coupling an image to a result of execution of semantic segmentation on the image, an image having a wider angle of view than the image.

9 Claims, 10 Drawing Sheets

(51) Int. Cl.
*G06T 3/40* (2006.01)
*G06V 30/262* (2022.01)
*G06F 18/214* (2023.01)
*G06F 18/21* (2023.01)
*G06F 18/2413* (2023.01)
*G06V 10/764* (2022.01)

(52) U.S. Cl.
CPC ......... *G06F 18/2413* (2023.01); *G06N 20/00* (2019.01); *G06T 3/4038* (2013.01); *G06V 10/764* (2022.01); *G06V 30/274* (2022.01); *G06T 2207/20081* (2013.01)

(58) Field of Classification Search
CPC .......... G06N 3/084; G06N 20/00; G06N 3/04; G06N 3/02; G06N 3/0464; G06T 2207/20084; G06T 2207/20081; G06T 3/4038; G06F 18/214; G06F 18/24; G06F 18/2163; G06F 18/2413; H04N 1/387
See application file for complete search history.

(56) References Cited

U.S. PATENT DOCUMENTS

| | | | |
|---|---|---|---|
| 2016/0070976 A1* | 3/2016 | Aoba | G06V 10/776 |
| | | | 382/180 |
| 2016/0125572 A1* | 5/2016 | Yoo | G06T 5/002 |
| | | | 382/157 |
| 2017/0255947 A1* | 9/2017 | Horikawa | G06V 40/20 |
| 2017/0262735 A1* | 9/2017 | Ros Sanchez | G06F 18/214 |
| 2018/0122044 A1* | 5/2018 | Bai | G06T 3/4038 |
| 2018/0253869 A1* | 9/2018 | Yumer | G06T 11/60 |
| 2018/0260975 A1* | 9/2018 | Sunkavalli | G06N 3/045 |
| 2018/0359416 A1* | 12/2018 | Hold-Geoffroy | G06V 10/764 |
| 2019/0130216 A1* | 5/2019 | Tomioka | G06F 18/214 |
| 2019/0259139 A1* | 8/2019 | Ichihashi | G06T 3/0093 |
| 2020/0334855 A1* | 10/2020 | Higo | G06T 7/0002 |
| 2021/0133980 A1* | 5/2021 | Aoba | G06F 18/2431 |
| 2022/0207849 A1* | 6/2022 | Gausebeck | G06T 19/006 |

FOREIGN PATENT DOCUMENTS

| | | |
|---|---|---|
| JP | 2016-163971 A | 9/2016 |
| JP | 2017-162456 A | 9/2017 |
| JP | 2017-204085 A | 11/2017 |

OTHER PUBLICATIONS

Hayashi, Ryuho, et al.; "Integration of video and computer graphics image on the ensphered vision", Proceedings of the Virtual Reality Society of Japan annual conference 8, Sep. 30, 2003, pp. 1-4.

* cited by examiner

LEARNING DEVICE, IMAGE GENERATING DEVICE, LEARNING METHOD, IMAGE GENERATING METHOD, AND PROGRAM

TECHNICAL FIELD

The present invention relates to a learning device, an image generating device, a learning method, an image generating method, and a program.

BACKGROUND ART

A technology of image based lighting (IBL) is known which generates a realistic computer graphics (CG) image or an image in which CG and an actually photographed image are synthesized with each other, while using a light source set on the basis of the actually photographed image.

In order to improve the reality of the generated image, it is preferable in IBL to set the light source on the basis of an image having a wide angle of view such as a 360-degree image with a high dynamic range (HDR) or the like. However, obtainment of an image having a wide angle of view requires photographing by dedicated equipment such as an omnidirectional camera or a semi-omnidirectional camera and also requires expertise.

Therefore, instead of generating an image suitable for IBL by photographing, an image suitable for IBL is generated by using an image generating section implemented by a learned machine learning model or the like. In this case, inputting an image photographed by an ordinary camera to the image generating section, for example, generates an image that is supplemented with a result of estimation of an environment outside the angle of view of the image, the environment being an object, a landscape, or the like outside the angle of view of the image, and which has a wider angle of view than the image.

SUMMARY

Technical Problems

However, the conventional technology that generates an image having a wide angle of view as described above does not have a sufficient accuracy of estimation of the environment outside the angle of view of the input image, and consequently may not generate a desired image.

The present invention has been made in view of the above problems. It is an object of the present invention to provide a learning device, an image generating device, a learning method, an image generating method, and a program that can improve accuracy of estimation of an environment outside the angle of view of an image input to an image generating section.

Solution to Problems

In order to solve the above problems, according to the present invention, there is provided a learning device including an image obtaining section configured to obtain an input image, a result data obtaining section configured to obtain result data indicating a result of execution of semantic segmentation on the input image, an input data generating section configured to generate input data obtained by coupling the input image and the result data to each other, and a learning section configured to perform, by using the input data as input, learning of an image generating section that generates, in response to input of data obtained by coupling an image to a result of execution of semantic segmentation on the image, an image having a wider angle of view than the image.

In one aspect of the present invention, the image obtaining section further obtains a learning image having a wider angle of view than the input image, the learning image being different from the image generated by the image generating section in response to the input of the input data obtained by coupling the input image and the result data to each other, and the learning section performs the learning of the image generating section on a basis of the image generated by the image generating section in response to the input of the input data obtained by coupling the input image and the result data to each other and the learning image.

In addition, according to the present invention, there is provided an image generating device including an image obtaining section configured to obtain an input image, a result data obtaining section configured to obtain result data indicating a result of execution of semantic segmentation on the input image, an input data generating section configured to generate input data obtained by coupling the input image and the result data to each other, and an image generating section configured to generate an image having a wider angle of view than the input image in response to input of the input data.

In addition, according to the present invention, there is provided a learning method including a step of obtaining an input image, a step of obtaining result data indicating a result of execution of semantic segmentation on the input image, a step of generating input data obtained by coupling the input image and the result data to each other, and a step of performing, by using the input data as input, learning of an image generating section that generates, in response to input of data obtained by coupling an image to a result of execution of semantic segmentation on the image, an image having a wider angle of view than the image.

In addition, according to the present invention, there is provided an image generating method including a step of obtaining an input image, a step of obtaining result data indicating a result of execution of semantic segmentation on the input image, a step of generating input data obtained by coupling the input image and the result data to each other, and a step of generating an image having a wider angle of view than the input image in response to input of the input data.

In addition, according to the present invention, there is provided a program for making a computer perform a procedure of obtaining an input image, a procedure of obtaining result data indicating a result of execution of semantic segmentation on the input image, a procedure of generating input data obtained by coupling the input image and the result data to each other, and a procedure of performing, by using the input data as input, learning of an image generating section that generates, in response to input of data obtained by coupling an image to a result of execution of semantic segmentation on the image, an image having a wider angle of view than the image.

In addition, according to the present invention, there is provided another program for making a computer perform a procedure of obtaining an input image, a procedure of obtaining result data indicating a result of execution of semantic segmentation on the input image, a procedure of generating input data obtained by coupling the input image and the result data to each other, and a procedure of generating an image having a wider angle of view than the input image in response to input of the input data.

DESCRIPTION OF EMBODIMENTS

First Embodiment

A first embodiment as an embodiment of the present invention will hereinafter be described in detail with reference to the drawings.

Figure 1:
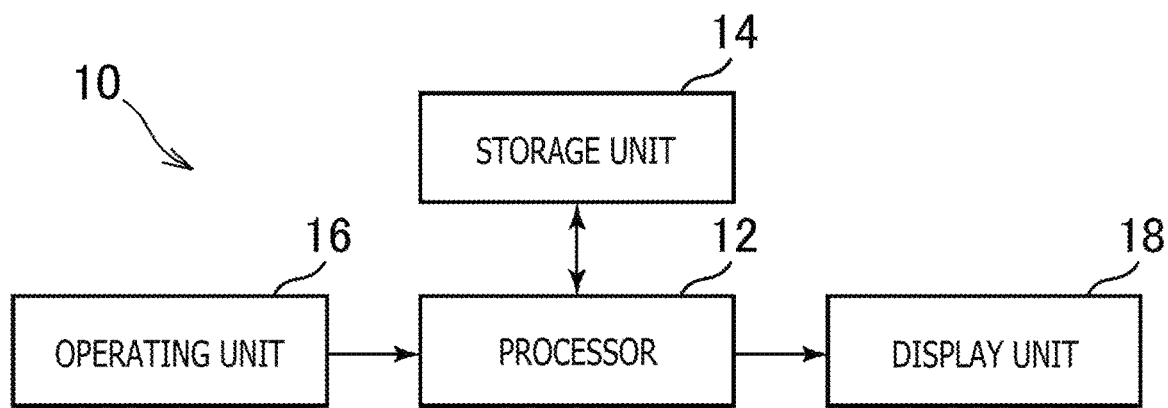
FIG. 1 is a block diagram of an image processing device according to a first embodiment.

FIG. 1 is a block diagram of an image processing device 10 according to the present embodiment. The image processing device 10 according to the present embodiment is, for example, a computer such as a game console or a personal computer. As illustrated in FIG. 1, the image processing device 10 according to the present embodiment includes, for example, a processor 12, a storage unit 14, an operating unit 16, and a display unit 18.

The processor 12 is, for example, a program control device such as a central processing unit (CPU) that operates according to a program installed on the image processing device 10.

The storage unit 14 is a storage element such as a read only memory (ROM), a random access memory (RAM), or the like, a hard disk drive, or the like. The storage unit 14 stores the program executed by the processor 12 and the like.

The operating unit 16 is a user interface such as a keyboard, a mouse, a controller of the game console, and the like. The operating unit 16 receives an operating input of a user, and outputs a signal indicating the content of the signal to the processor 12.

The display unit 18 is a display device such as a liquid crystal display. The display unit 18 displays various kinds of images according to instructions of the processor 12.

Incidentally, the image processing device 10 may include a communication interface such as a network board or the like, an optical disk drive for reading an optical disk such as a digital versatile disc (DVD)-ROM, a Blu-ray (registered trademark) disk, or the like, a universal serial bus (USB) port, and the like.

Learned machine learning models are implemented in the image processing device 10 according to the present embodiment. On the basis of a two-dimensional image such as an image photographed by an ordinary camera or the like, an image that is supplemented with an object or a landscape outside the angle of view of the two-dimensional image and which has a wider angle of view than the two-dimensional image is generated by using the machine learning models. Here, an omnidirectional image (360-degree image), a semi-omnidirectional image (180-degree image), or the like, for example, may be generated. In addition, a panoramic image, for example, may be generated.

An example of learning of the machine learning models implemented in the image processing device 10 according to the present embodiment will be described in the following.

Figure 2:
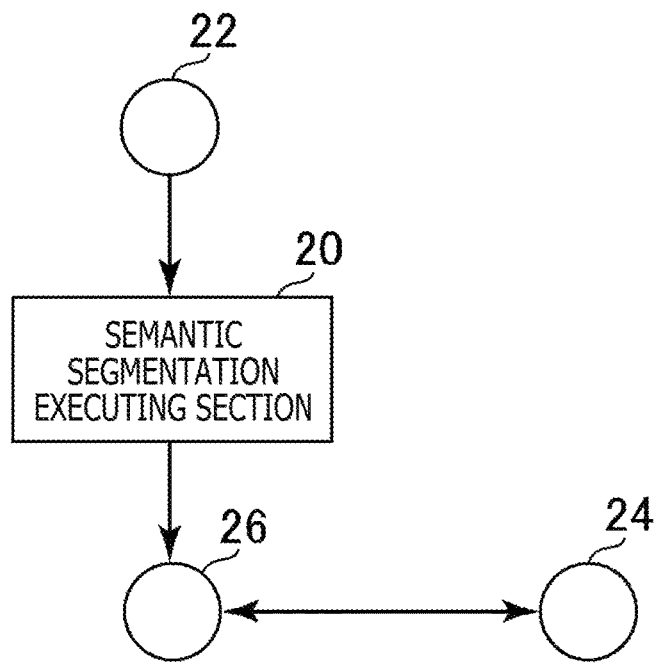
FIG. 2 is a diagram illustrating an example of first learning according to the first embodiment.

In the learning of the machine learning models implemented in the image processing device 10 according to the present embodiment, the learning of a semantic segmentation executing section 20 is performed first, as illustrated in FIG. 2. Here, learning data used for the learning of the semantic segmentation executing section 20 will be referred to as first learning data. In addition, the learning of the semantic segmentation executing section 20 will be referred to as first learning in the following.

The semantic segmentation executing section 20 is, for example, a machine learning model implemented by a convolutional neural network (CNN). In response to input of an image, for example, the semantic segmentation executing section 20 outputs a result of execution of semantic segmentation on the image.

The first learning data, for example, includes a combination of a first learning input image 22 and teacher data 24.

The first learning input image 22 included in the first learning data is, for example, an image input to the semantic segmentation executing section 20 in the first learning. The first learning input image 22 is, for example, a two-dimensional image such as an image photographed by an ordinary camera or the like. The first learning input image 22 may be an image with a standard dynamic range (SDR).

The teacher data 24 included in the first learning data is, for example, an image that, in a pixel unit included in the first learning input image 22 included in the first learning data, indicates a category corresponding to an object represented by the pixel. The teacher data 24 may be, for example, an image divided in pixel units into a plurality of regions each associated with a category corresponding to an object as a recognition result. In addition, the teacher data 24 may be data including a plurality of images each associated with a category corresponding to an object. Then, a value indicating a probability that a pixel included in an image indicates the category of an object associated with the image may be set to the pixel.

Then, the present embodiment, for example, identifies result data 26 as an output when the first learning input image 22 is input to the semantic segmentation executing section 20. The result data 26 is, for example, data corresponding to a result of execution of semantic segmentation by the semantic segmentation executing section 20. Here, the result data 26 is, for example, an image that is similar to the teacher data 24 and which, in a pixel unit included in the first learning input image 22, indicates a category corresponding to an object represented by the pixel.

Then, the present embodiment, for example, identifies an error (comparison result) between the result data 26 as an output when the first learning input image 22 included in the first learning data is input to the semantic segmentation executing section 20 and the teacher data 24 included in the first learning data. Here, a softmax entropy error, for example, may be identified. Then, on the basis of the identified error, the value of a parameter in the semantic segmentation executing section 20 is updated by an error back propagation method, for example.

Figure 3:
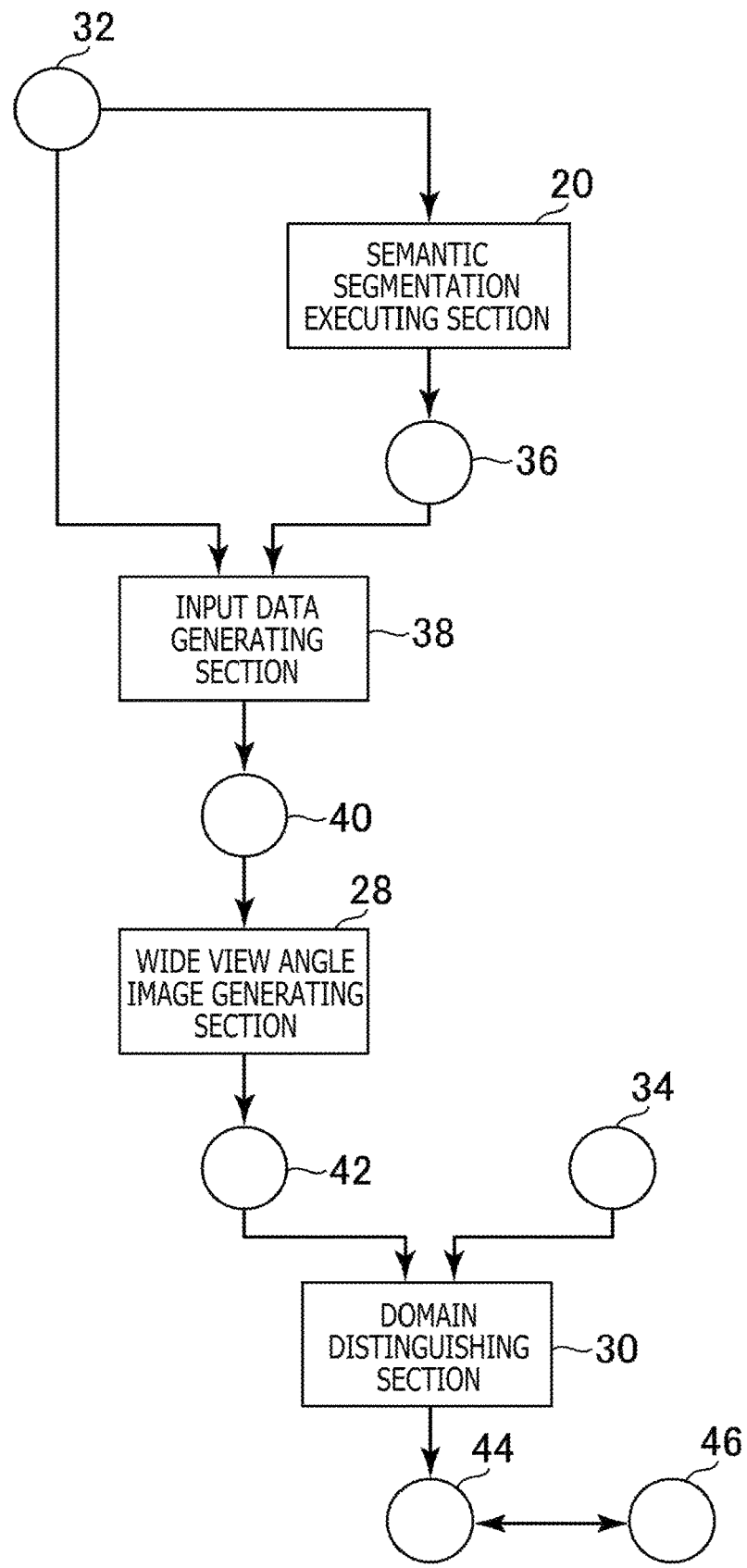
FIG. 3 is a diagram illustrating an example of second learning according to the first embodiment.

Then, in the present embodiment, after the first learning using a plurality of pieces of first learning data is performed, the learning of a wide view angle image generating section 28 is performed, as illustrated in FIG. 3. Here, learning data used for the learning of the wide view angle image generating section 28 will be referred to as second learning data. In addition, the learning of the wide view angle image generating section 28 will hereinafter be referred to as second learning.

In the following, description will be made of an example of the second learning in which not only the learning of the wide view angle image generating section 28 but also the learning of a domain distinguishing section 30 is performed by using a technology of a generative adversarial network (GAN).

The wide view angle image generating section 28 is, for example, a machine learning model implemented by a CNN. Input to the wide view angle image generating section 28 is, for example, data obtained by coupling an image and a result of execution of semantic segmentation on the image.

Then, the wide view angle image generating section 28 estimates an environment outside the angle of view of the image included in the input data, the environment being an object, a landscape, or the like outside the angle of view of the image, for example. Then, the wide view angle image generating section 28, for example, generates an image reflecting a result of the estimation and having a wider angle of view than the image included in the input data. When the image included in the input data is estimated to be an indoor image, for example, an image complemented with an image of a ceiling may be generated. In addition, when the image included in the input data is estimated to be an outdoor image, for example, an image complemented with an image of the sky may be generated. Here, an omnidirectional image or a semi-omnidirectional image, for example, may be generated. In addition, a panoramic image, for example, may be generated. In addition, the generated image may be an image with a high dynamic range (HDR). The wide view angle image generating section 28 then outputs the generated image.

The domain distinguishing section 30 is, for example, a machine learning model implemented by a CNN. Input to the domain distinguishing section 30 is, for example, either the image generated by the wide view angle image generating section 28 or an image different from the image generated by the wide view angle image generating section 28. Then, the domain distinguishing section 30, for example, outputs a distinction result indicating whether or not the image input to the domain distinguishing section 30 is the image generated by the wide view angle image generating section 28. Here, the domain distinguishing section 30 may output data indicating the level of a possibility that the image input to the domain distinguishing section 30 is the image generated by the wide view angle image generating section 28.

The second learning data includes a second learning input image 32 and a learning wide view angle image 34.

The second learning input image 32 included in the second learning data is, for example, an image input to the semantic segmentation executing section 20 in which the first learning is performed. The second learning input image 32 is, for example, a two-dimensional image such as an image photographed by an ordinary camera. The second learning input image 32 may be an image with the SDR. Incidentally, the first learning input image 22 may be used as the second learning input image 32. In addition, an image different from the first learning input image 22 may be used as the second learning input image 32.

The learning wide view angle image 34 included in the second learning data is, for example, a wide view angle image such as an omnidirectional image photographed by an omnidirectional camera, a semi-omnidirectional image photographed by a semi-omnidirectional camera, or the like, the wide view angle image not being the image generated by the wide view angle image generating section 28. Incidentally, the learning wide view angle image 34 may be a panoramic image photographed by a panoramic camera. In addition, the learning wide view angle image 34 may be an image with the HDR.

In addition, an image associated with the second learning input image 32 included in the second learning data may be used as the learning wide view angle image 34 included in the second learning data. The learning wide view angle image 34 included in the second learning data may, for example, be an image photographed at a same position as the second learning input image 32 included in the second learning data.

The second learning first identifies an output when the second learning input image 32 included in the second learning data is input to the learned semantic segmentation executing section 20, that is, result data 36 as a result of execution of semantic segmentation.

Then, an input data generating section 38 generates learning input data 40 obtained by coupling the second learning input image 32 and the result data 36 to each other. Here, the learning input data 40 is, for example, data having a larger number of channels than the second learning input image 32, the data being data obtained by coupling the second learning input image 32 and the result data 36 to each other in a channel direction or the like. For example, for each pixel in the learning input data 40, a value indicating a category corresponding to an object represented by the pixel in the result data 36 may be set in addition to a pixel value (RGB value) indicated by the second learning input image 32. In addition, for each pixel in the learning input data 40, a value indicating a probability for each of a plurality of objects that the pixel represents the object may be set in addition to the pixel value (RGB value) indicated by the second learning input image 32.

The learning input data 40 is then input to the wide view angle image generating section 28. Then, in response to the input of the learning input data 40, the wide view angle image generating section 28 generates an image having a wider angle of view than the second learning input image 32 included in the learning input data 40. The thus generated image will be referred to as a generated wide view angle image 42.

Then, either the generated wide view angle image 42 generated on the basis of the second learning input image 32 included in the second learning data or the learning wide view angle image 34 included in the second learning data is input to the domain distinguishing section 30.

The domain distinguishing section 30 then, for example, outputs generation possibility data 44 indicating the level of a possibility that the image input to the domain distinguishing section 30 is the generated wide view angle image 42. An error (comparison result) is then identified between the generation possibility data 44 and domain distinguishing data 46 indicating whether the image input to the domain distinguishing section 30 is the generated wide view angle image 42 or the learning wide view angle image 34.

Here, a value associated with either the generated wide view angle image 42 or the learning wide view angle image 34, for example, may be set as the value of the domain distinguishing data 46.

The generation possibility data 44 may, for example, be data assuming a value of zero to one, both inclusive. In this case, the domain distinguishing data 46 may, for example, be data that assumes one as a value in a case where the image input to the domain distinguishing section 30 is the generated wide view angle image 42 and that assumes zero as a value in a case where the image input to the domain distinguishing section 30 is the learning wide view angle image 34.

In addition, the generation possibility data 44 and the domain distinguishing data 46 may, for example, be expressed as a vector including two elements. For example, the value of a first element of the generation possibility data 44 may be a value indicating the level of a possibility that the image input to the domain distinguishing section 30 is the generated wide view angle image 42. In addition, the value of a second element of the generation possibility data 44 may be a value indicating the level of a possibility that the image input to the domain distinguishing section 30 is the learning wide view angle image 34. In this case, the value of the domain distinguishing data 46 associated with the generated wide view angle image 42 may be expressed by a two-dimensional vector (1, 0), and the value of the domain distinguishing data 46 associated with the learning wide view angle image 34 may be expressed by a two-dimensional vector (0, 1).

Then, the present embodiment updates the value of a parameter of either the wide view angle image generating section 28 or the domain distinguishing section 30 by an error back propagation method, for example, on the basis of an error between the generation possibility data 44 and the domain distinguishing data 46.

Here, the second learning according to the present embodiment may alternately repeat the updating of the value of the parameter of the wide view angle image generating section 28 using a predetermined number of pieces of second learning data and the updating of the value of the parameter of the domain distinguishing section 30 using a predetermined number of pieces of second learning data. In this case, at the time of updating the value of the parameter of the wide view angle image generating section 28, the value of the parameter of the wide view angle image generating section 28 is updated in a state in which the value of the parameter of the domain distinguishing section 30 is fixed. In addition, at the time of updating the value of the parameter of the domain distinguishing section 30, the value of the parameter of the domain distinguishing section 30 is updated in a state in which the value of the parameter of the wide view angle image generating section 28 is fixed.

The machine learning models implemented in the image processing device 10 are learned as described above.

Figure 4:
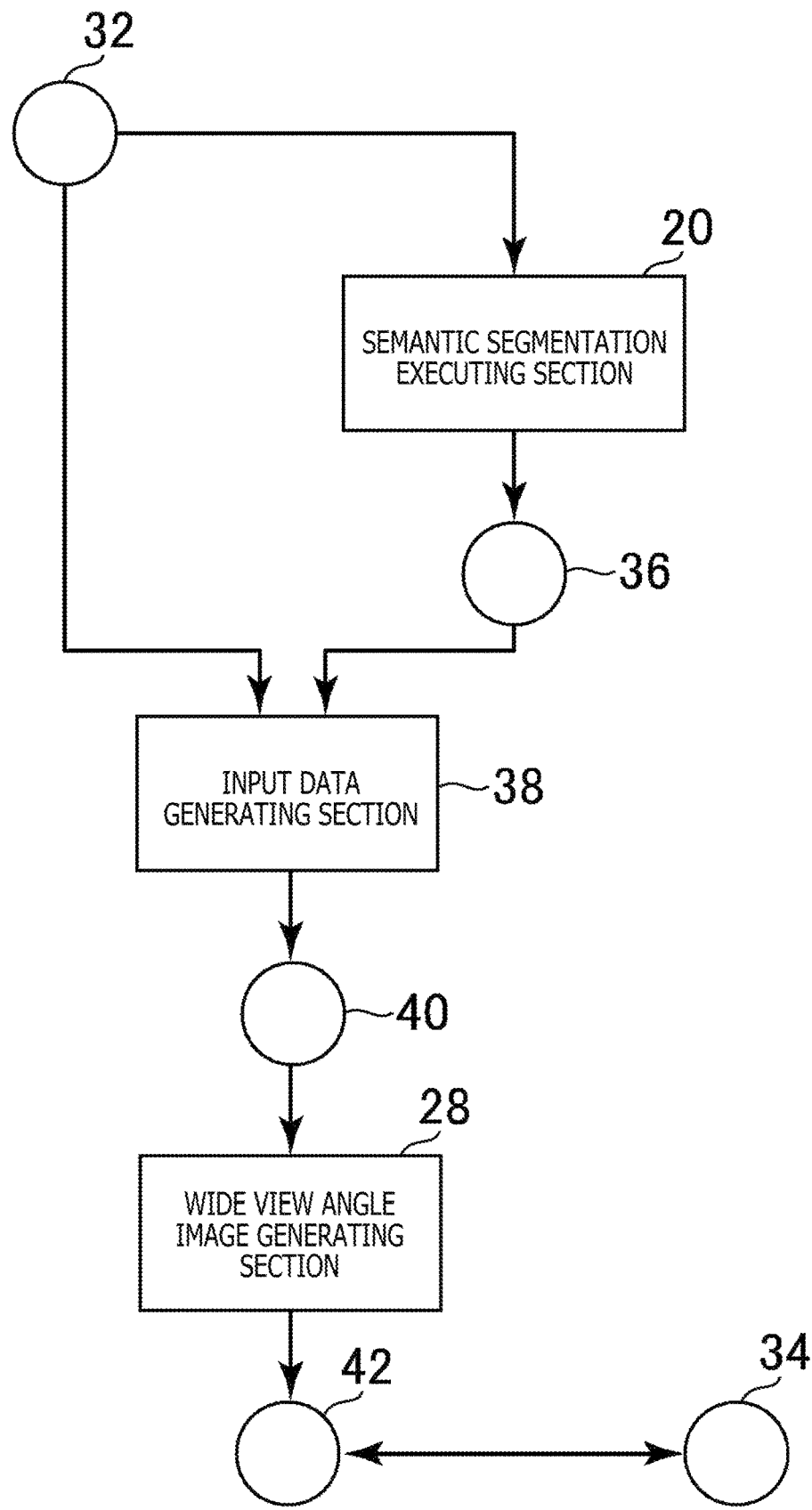
FIG. 4 is a diagram illustrating another example of the second learning according to the first embodiment.

It is to be noted that the method of the second learning is not limited to the above-described method. For example, as illustrated in FIG. 4, the second learning may be performed without using the GAN technology. In an example of FIG. 4, the learning of the wide view angle image generating section 28 is performed without using the domain distinguishing section 30. The learning wide view angle image 34 included in the second learning data in the second learning illustrated in FIG. 4 is an image that is associated with the second learning input image 32 included in the second learning data, and which is an image photographed from a same position as the second learning input image 32 included in the second learning data or the like.

In the example of the second learning illustrated in FIG. 4, an error (comparison result) is identified between the generated wide view angle image 42 generated on the basis of the second learning input image 32 included in the second learning data and the learning wide view angle image 34 included in the second learning data. Here, a mean absolute error (MAE), a mean square error (MSE), or a root mean square error (RMSE), for example, may be identified. Then, on the basis of the identified error, the value of the parameter of the wide view angle image generating section 28 is updated by an error back propagation method, for example.

In the present embodiment, on the basis of a two-dimensional image such as an image photographed by an ordinary camera or the like, an image supplemented with an object or a landscape outside the angle of view of the two-dimensional image and having a wider angle of view than the two-dimensional image is generated by using the machine learning models in which learning is performed as described above, for example.

Figure 5:
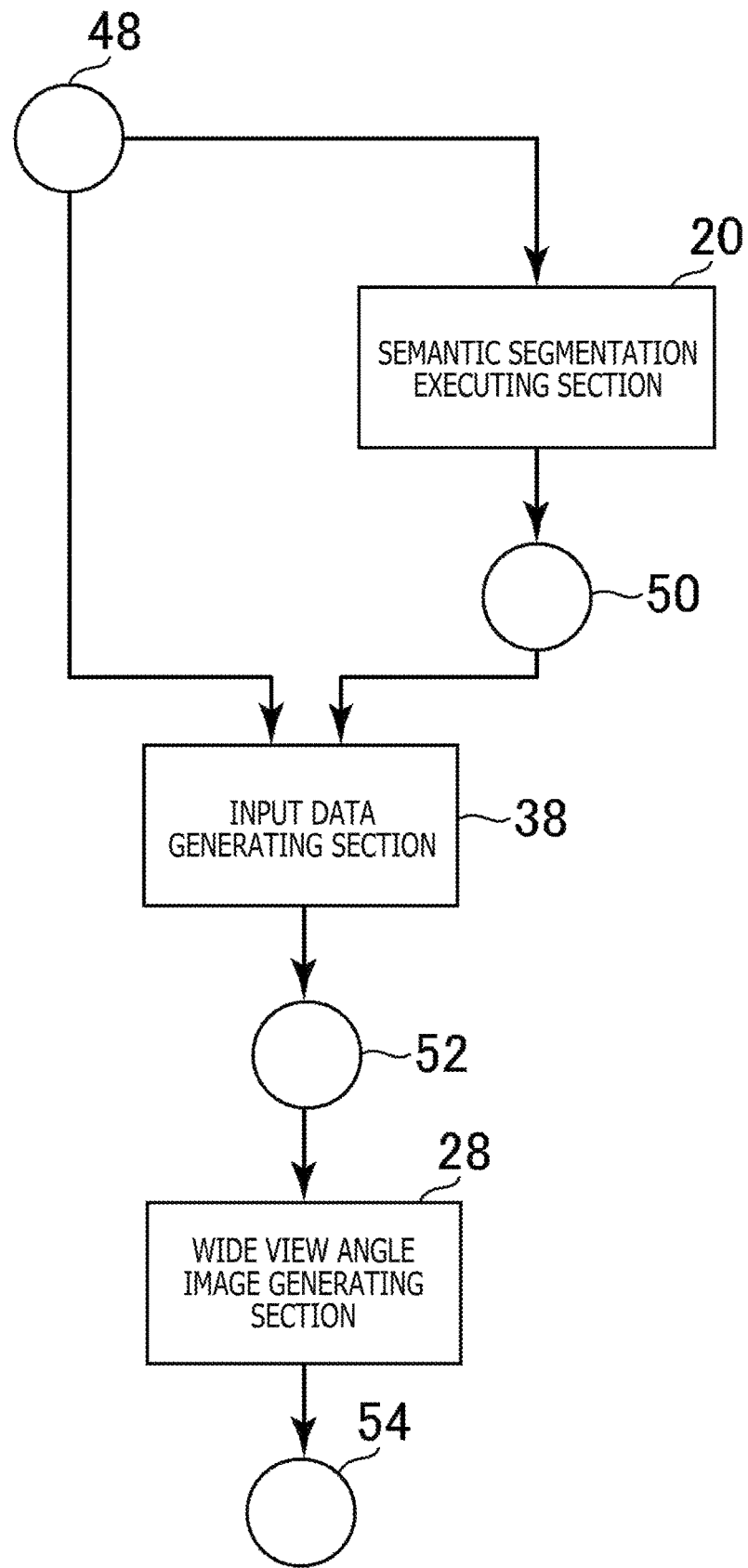
FIG. 5 is a diagram illustrating an example of generation of an image according to the first embodiment.

The generation of an image by using the learned machine learning models will be described in the following with reference to FIG. 5.

First, a two-dimensional image such as an image photographed by an ordinary camera or the like is input to the learned semantic segmentation executing section 20. The thus input image will hereinafter be referred to as a target input image 48. The target input image 48 may be an image with the SDR. Then, an output of the semantic segmentation executing section 20 which output corresponds to the input of the target input image 48, that is, result data 50 as a result of execution of semantic segmentation is identified.

The input data generating section 38 then generates target input data 52 obtained by coupling the target input image 48 and the result data 50 to each other.

The target input data 52 is then input to the learned wide view angle image generating section 28. The wide view angle image generating section 28 then generates and outputs an image corresponding to the target input data 52. The image generated here is, for example, an image supplemented with an object or a landscape outside the angle of view of the target input image 48 and having a wider angle of view than the target input image 48. The generated image will hereinafter be referred to as a target wide view angle image 54. The target wide view angle image 54 may be an image with the HDR. The wide view angle image generating section 28 then outputs the generated target wide view angle image 54.

In the present embodiment, as described above, the first learning (learning of the semantic segmentation executing section 20) is performed separately from the second learning (learning of the wide view angle image generating section 28). The target input data 52 is then input to the wide view angle image generating section 28, the target input data 52 being a combination of the target input image 48 and the output of the learned semantic segmentation executing section 20 in response to the input of the target input image 48. The target input data 52 is data having a larger number of channels than the target input image 48. The wide view angle image generating section 28 then estimates an environment outside the angle of view of the target input image 48 on the basis of the target input data 52. The target wide view angle image 54 reflecting a result of the estimation is then output.

Thus, according to the present embodiment, it is possible to improve accuracy of estimation of the environment outside the angle of view of the target input image 48 as compared with a case of estimating the environment outside the angle of view of the target input image 48 from only the target input image 48. For example, a light source in image based lighting (IBL) may be set on the basis of the target wide view angle image 54 generated by the image processing device 10 according to the present embodiment. It is to be noted that, needless to say, applications of the target wide view angle image 54 generated by the image processing device 10 according to the present embodiment are not limited to IBL.

In the following, further description will be made of functions of the image processing device 10 according to the present embodiment and processing performed by the image processing device 10.

Figure 6:
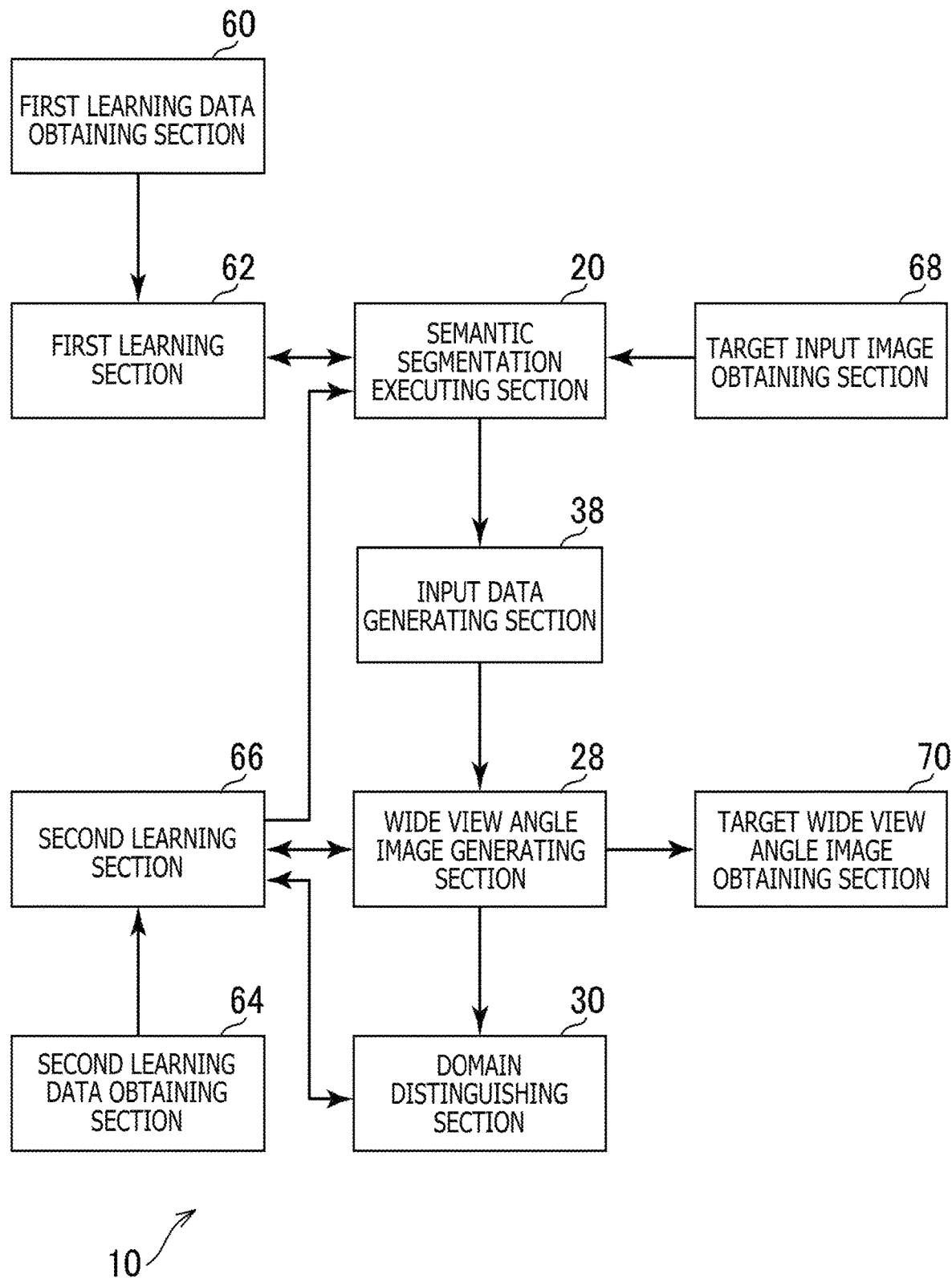
FIG. 6 is a functional block diagram illustrating an example of functions implemented by the image processing device according to the first embodiment.

FIG. 6 is a functional block diagram illustrating an example of functions implemented by the image processing device 10 according to the present embodiment. Incidentally, the image processing device 10 according to the present embodiment does not need to implement all of the functions illustrated in FIG. 6, and may implement a function other than the functions illustrated in FIG. 6.

As illustrated in FIG. 6, the image processing device 10 according to the present embodiment functionally includes, for example, the semantic segmentation executing section 20, the wide view angle image generating section 28, the domain distinguishing section 30, the input data generating section 38, a first learning data obtaining section 60, a first learning section 62, a second learning data obtaining section 64, a second learning section 66, a target input image obtaining section 68, and a target wide view angle image obtaining section 70. The above elements are implemented mainly by the processor 12 and the storage unit 14.

The image processing device 10 according to the present embodiment has not only a role as a learning device that performs the learning of the machine learning models implemented in the image processing device 10 but also a role as an image generating device that performs generation of an image using the learned machine learning models. In an example of FIG. 6, the semantic segmentation executing section 20, the wide view angle image generating section 28, the domain distinguishing section 30, the input data generating section 38, the first learning data obtaining section 60, the first learning section 62, the second learning data obtaining section 64, and the second learning section 66 correspond to the role as the learning device. In addition, the semantic segmentation executing section 20, the wide view angle image generating section 28, the domain distinguishing section 30, the input data generating section 38, the target input image obtaining section 68, and the target wide view angle image obtaining section 70 correspond to the role as the image generating device.

The above functions may be implemented by the processor 12 by executing a program that is installed on the image processing device 10 as a computer and includes commands corresponding to the above functions. This program may, for example, be supplied to the image processing device 10 via a computer readable information storage medium such as an optical disk, a magnetic disk, a magnetic tape, a magneto-optical disk, a flash memory, or the like, or via the Internet or the like.

As described above, in response to input of an image, the semantic segmentation executing section 20 in the present embodiment, for example, outputs a result of execution of semantic segmentation on the image.

As described above, in response to input of data obtained by coupling an image to a result of execution of semantic segmentation on the image, the wide view angle image generating section 28 in the present embodiment, for example, generates an image having a wider angle of view than the image. In addition, as described above, the wide view angle image generating section 28 in the present embodiment, for example, outputs the generated image.

As described above, the domain distinguishing section 30 in the present embodiment, for example, outputs a distinction result indicating whether or not an image input to the domain distinguishing section 30 is the image generated by the wide view angle image generating section 28.

The input data generating section 38 in the present embodiment, for example, generates input data obtained by coupling an image to a result of execution of semantic segmentation on the image. The input data generating section 38, for example, generates the learning input data 40 and the target input data 52 described above.

The first learning data obtaining section 60 in the present embodiment, for example, obtains the above-described first learning data including the combination of the first learning input image 22 and the teacher data 24.

The first learning section 62 in the present embodiment, for example, performs the first learning using the first learning data obtained by the first learning data obtaining section 60.

The second learning data obtaining section 64 in the present embodiment, for example, obtains the above-described second learning data including the second learning input image 32 and the learning wide view angle image 34. As described above, the learning wide view angle image 34 is, for example, an image that has a wider angle of view than the second learning input image 32 and which is different from the image generated by the wide view angle image generating section 28 in response to the input of the learning input data 40.

The second learning section 66 in the present embodiment, for example, performs the second learning using the second learning data obtained by the second learning data obtaining section 64. In addition, the second learning section 66 in the present embodiment, for example, obtains the result data 36 indicating a result of execution of semantic segmentation on the second learning input image 32. In addition, the second learning section 66 in the present embodiment, for example, performs the learning of the wide view angle image generating section 28 by using, as input, the learning input data 40 generated by the input data generating section 38.

In addition, the second learning section 66 in the present embodiment, for example, obtains the generated wide view angle image 42 generated by the wide view angle image generating section 28 in response to the input of the learning input data 40 obtained by coupling the second learning input image 32 included in the second learning data and the result data 36 to each other. In addition, the second learning section 66 in the present embodiment, for example, performs the learning of the wide view angle image generating section 28 on the basis of the generated wide view angle image 42 and the learning wide view angle image 34 included in the second learning data.

The target input image obtaining section 68 in the present embodiment, for example, obtains the above-described target input image 48 input to the learned wide view angle image generating section 28.

The target wide view angle image obtaining section 70 in the present embodiment, for example, obtains the target wide view angle image 54 generated and output by the wide view angle image generating section 28 in response to the input of the target input data 52 generated on the basis of the target input image 48 as described above.

Figure 7:
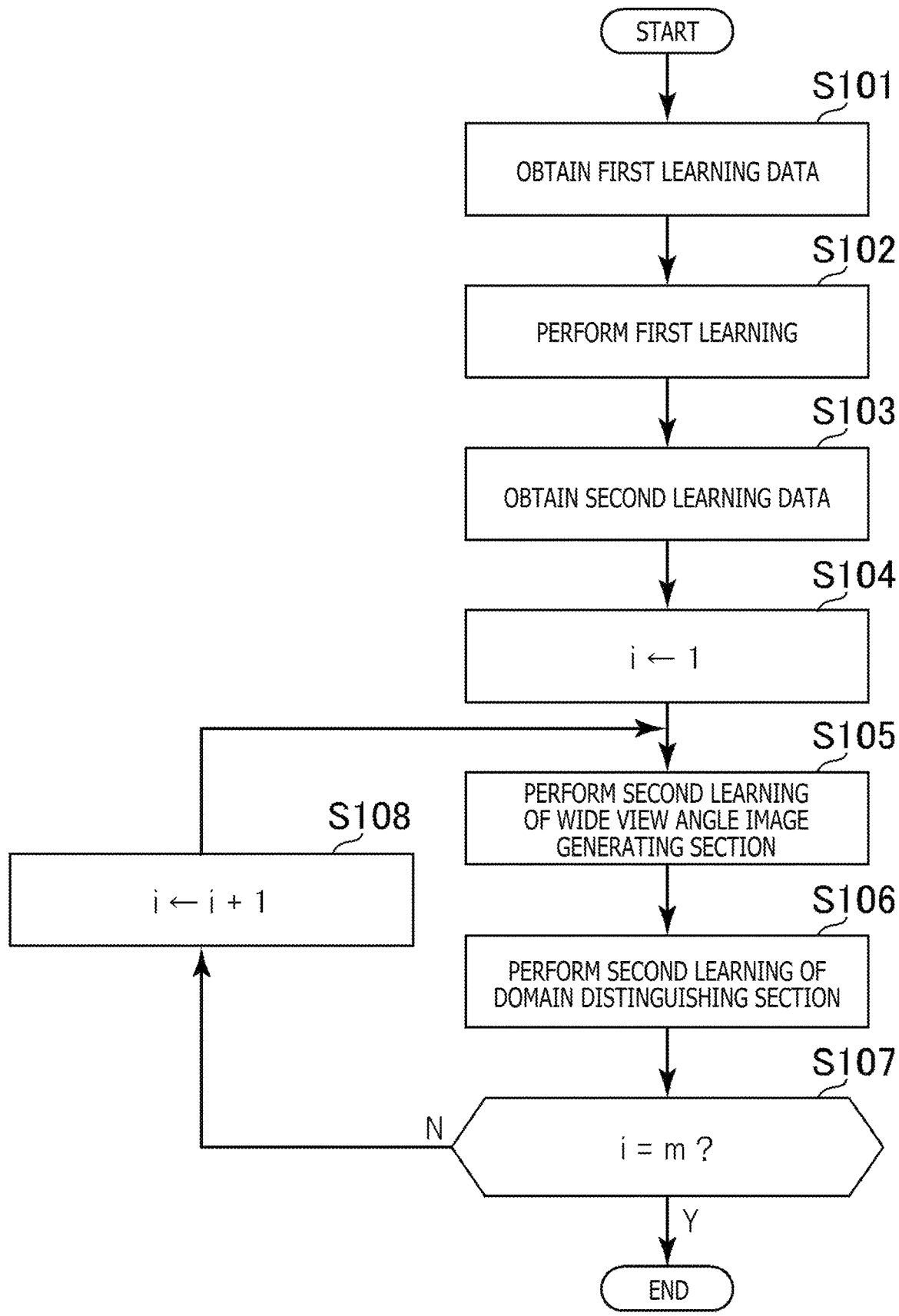
FIG. 7 is a flowchart illustrating an example of a flow of learning processing performed by the image processing device according to the first embodiment.

In the following, referring to a flowchart illustrated in FIG. 7, description will be made of an example of a flow of learning processing of the semantic segmentation executing section 20, the wide view angle image generating section 28, and the domain distinguishing section 30, the learning processing being performed by the image processing device 10 according to the present embodiment. The processing example illustrated in FIG. 7 corresponds to the contents described with reference to FIG. 3.

First, the first learning data obtaining section 60 obtains a plurality of pieces of first learning data (S101).

Then, the first learning section 62 performs the first learning using the plurality of pieces of first learning data obtained by the processing indicated in S101 (S102).

Then, the second learning data obtaining section 64 obtains a plurality of pieces of second learning data (S103). Suppose here that m×2n (m and n are an integer) pieces of second learning data, for example, are obtained. In addition, suppose that the m×2n pieces of second learning data are divided into data groups each including 2n pieces of second learning data. An ith (1≤i≤m) data group will hereinafter be referred to as an ith data group.

Then, the second learning section 66 sets one to the value of a variable i (S104).

Then, the second learning section 66 performs the second learning of the wide view angle image generating section 28 using n pieces of second learning data included in the ith data group (S105). In the processing indicated in S105, the value of the parameter of the wide view angle image generating section 28 is updated in a state in which the value of the parameter of the domain distinguishing section 30 is fixed.

Then, the second learning section 66 performs the second learning of the domain distinguishing section 30 using remaining n pieces of second learning data included in the ith data group and not used in the processing indicated in S105 (S106). In the processing indicated in S106, the value of the parameter of the domain distinguishing section 30 is updated in a state in which the value of the parameter of the wide view angle image generating section 28 is fixed.

Then, the second learning section 66 checks whether or not the value of the variable i is m (S107). When the value is not m (S107: N), the second learning section 66 increments the value of the variable i by one (S108), and returns to the processing indicated in S105. When the value is m (S107: Y), the processing represented in the present processing example is ended.

Figure 8:
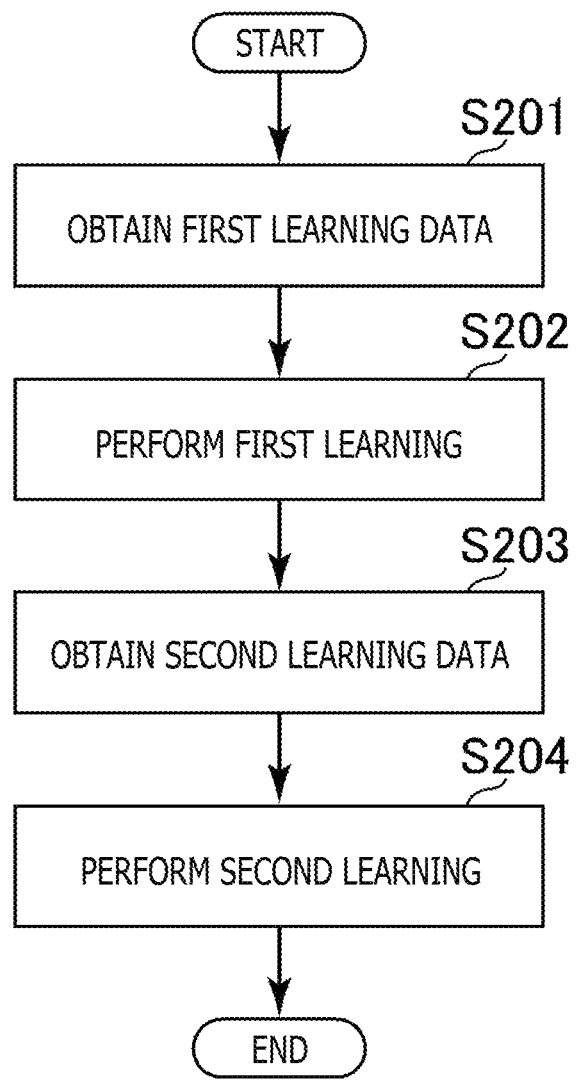
FIG. 8 is a flowchart illustrating another example of the flow of the learning processing performed by the image processing device according to the first embodiment.

In the following, referring to a flowchart illustrated in FIG. 8, description will be made of another example of the flow of the learning processing of the semantic segmentation executing section 20, the wide view angle image generating section 28, and the domain distinguishing section 30, the learning processing being performed by the image processing device 10 according to the present embodiment. The processing example represented in FIG. 8 corresponds to the contents described with reference to FIG. 4.

First, the first learning data obtaining section 60 obtains a plurality of pieces of first learning data (S201).

Then, the first learning section 62 performs the first learning using the plurality of pieces of first learning data obtained by the processing indicated in S201 (S202).

Then, the second learning data obtaining section 64 obtains a plurality of pieces of second learning data (S203).

Then, the second learning section 66 performs the second learning using the plurality of pieces of learning data obtained by the processing indicated in S203 (S204). The processing represented in the present processing example is then ended.

Figure 9:
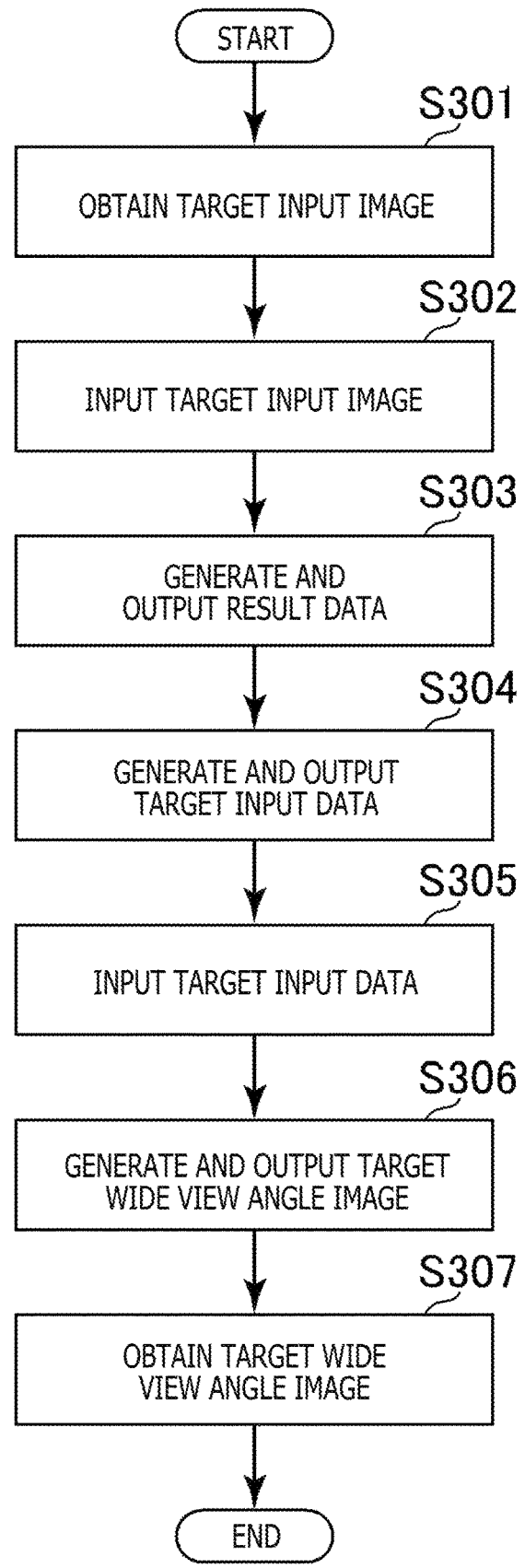
FIG. 9 is a flowchart illustrating an example of a flow of processing of generating a target wide view angle image, the processing being performed by the image processing device according to the first embodiment.

Next, referring to a flowchart illustrated in FIG. 9, description will be made of an example of a flow of processing of generating the target wide view angle image 54, the processing being performed by the image processing device 10 according to the present embodiment.

First, the target input image obtaining section 68 obtains the target input image 48 (S301).

Then, the target input image obtaining section 68 inputs the target input image 48 obtained by the processing indicated in S301 to the semantic segmentation executing section 20 (S302).

Then, the semantic segmentation executing section 20 generates the result data 50 corresponding to the target input image 48 input by the processing indicated in S302, and outputs the result data 50 (S303).

Then, the input data generating section 38 obtains the target input image 48 obtained by the processing indicated in S301 and the result data 50 output by the processing indicated in S303. The input data generating section 38 then generates the target input data 52 by coupling the obtained target input image 48 and the obtained result data 50 to each other. Then, the input data generating section 38 outputs the target input data (S304).

Then, the input data generating section 38 inputs the target input data 52 generated by the processing indicated in S304 to the wide view angle image generating section 28 (S305).

Then, the wide view angle image generating section 28 generates the target wide view angle image 54 corresponding to the target input data 52 input by the processing indicated in S305, and outputs the target wide view angle image 54 (S306).

Then, the target wide view angle image obtaining section 70 obtains the target wide view angle image 54 output by the processing indicated in S306 (S307). The processing represented in the present processing example is then ended.

Second Embodiment

A second embodiment as another embodiment of the present invention will hereinafter be described in detail with reference to drawings.

As with the image processing device 10 illustrated in FIG. 1, an image processing device 110 according to the present embodiment is, for example, a computer such as a game console or a personal computer and, for example, includes a processor, a storage unit, an operating unit, and a display unit, which are similar to those illustrated in FIG. 1.

Learned machine learning models are implemented in the image processing device 110 according to the present embodiment. Then, in the present embodiment, hyperspectral data is photographed by a hyperspectral camera. Then, an image having a wider angle of view than the hyperspectral data (image having a wider angle of view than the hyperspectral camera that has photographed the hyperspectral data) is generated by using the machine learning models on the basis of the hyperspectral data. Here, an omnidirectional image, a semi-omnidirectional image, or the like, for example, may be generated. In addition, a panoramic image, for example, may be generated.

An example of learning of the machine learning models implemented in the image processing device 110 according to the present embodiment will be described in the following.

Figure 10:
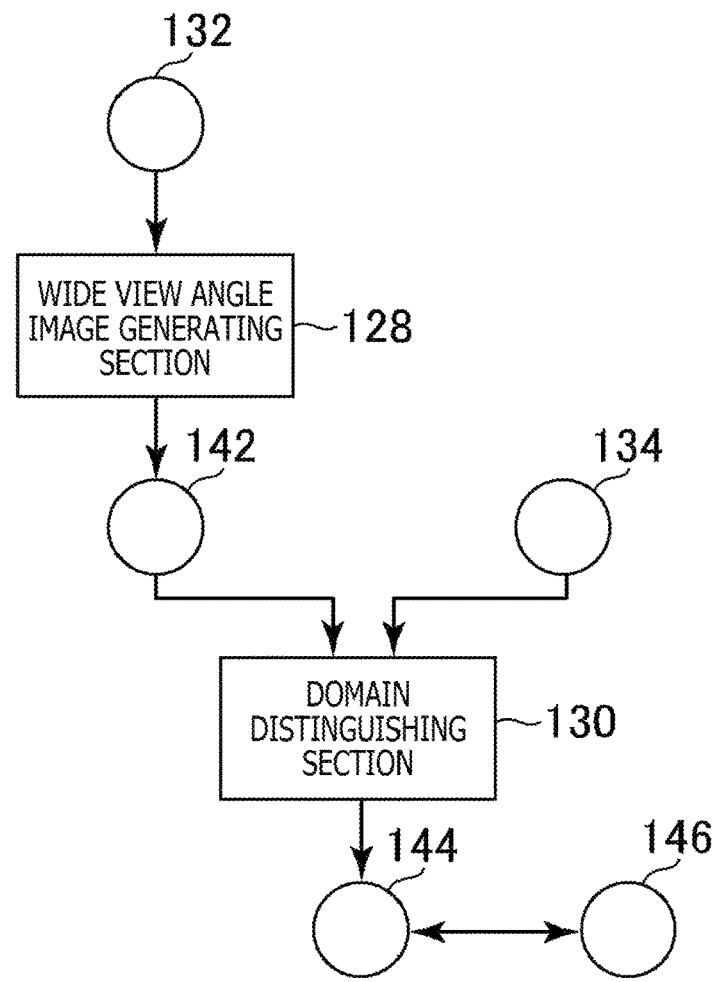
FIG. 10 is a diagram illustrating an example of learning according to a second embodiment.

In the present embodiment, as illustrated in FIG. 10, the learning of a wide view angle image generating section 128 is performed. Here, learning data used for the learning of the wide view angle image generating section 128 will be referred to as third learning data.

In the following, description will be made of an example of learning in which not only the learning of the wide view angle image generating section 128 but also the learning of a domain distinguishing section 130 is performed by using the GAN technology.

The wide view angle image generating section 128 is, for example, a machine learning model implemented by a CNN. Input to the wide view angle image generating section 128 is, for example, the hyperspectral data.

Then, the wide view angle image generating section 128 estimates an environment outside the angle of view of the image included in the input hyperspectral data, the environment being an object, a landscape, or the like outside the angle of view of the image, for example. Then, the wide view angle image generating section 128, for example, generates an image reflecting a result of the estimation and having a wider angle of view than the input hyperspectral data. When the image included in the input data is estimated to be an indoor image, for example, an image complemented with an image of a ceiling may be generated. In addition, when the image included in the input data is estimated to be an outdoor image, for example, an image complemented with an image of the sky may be generated. Here, an omnidirectional image or a semi-omnidirectional image, for example, may be generated. In addition, a panoramic image, for example, may be generated. In addition, the generated image may be an image with the HDR. The wide view angle image generating section 128 then outputs the generated image.

The domain distinguishing section 130 is, for example, a machine learning model implemented by a CNN. Input to the domain distinguishing section 130 is, for example, either the image generated by the wide view angle image generating section 128 or an image different from the image generated by the wide view angle image generating section 128. Then, the domain distinguishing section 130, for example, outputs a distinction result indicating whether or not the image input to the domain distinguishing section 130 is the image generated by the wide view angle image generating section 128. Here, the domain distinguishing section 130 may output data indicating the level of a possibility that the image input to the domain distinguishing section 130 is the image generated by the wide view angle image generating section 128.

The third learning data includes learning hyperspectral data 132 and a learning wide view angle image 134.

The learning hyperspectral data 132 included in the third learning data is, for example, the hyperspectral data input to the wide view angle image generating section 128.

The learning wide view angle image 134 included in the third learning data is, for example, a wide view angle image such as an omnidirectional image photographed by an omnidirectional camera, a semi-omnidirectional image photographed by a semi-omnidirectional camera, or the like, the wide view angle image not being the image generated by the wide view angle image generating section 128. Incidentally, the learning wide view angle image 134 may be a panoramic image photographed by a panoramic camera. In addition, the learning wide view angle image 134 may be an image with the HDR.

In addition, an image associated with the learning hyperspectral data 132 included in the third learning data may be used as the learning wide view angle image 134 included in the third learning data. The learning wide view angle image 134 included in the third learning data may, for example, be an image photographed at a same position as the learning hyperspectral data 132 included in the third learning data.

In the learning according to the present embodiment, first, the learning hyperspectral data 132 is input to the wide view angle image generating section 128. Then, in response to the input of the learning hyperspectral data 132, the wide view angle image generating section 128 generates an image having a wider angle of view than the learning hyperspectral data 132. The thus generated image will be referred to as a generated wide view angle image 142.

Then, either the generated wide view angle image 142 generated on the basis of the learning hyperspectral data 132 included in the third learning data or the learning wide view angle image 134 included in the third learning data is input to the domain distinguishing section 130.

The domain distinguishing section 130 then, for example, outputs generation possibility data 144 indicating the level of a possibility that the image input to the domain distinguishing section 130 is the generated wide view angle image 142. An error (comparison result) is then identified between the generation possibility data 144 and domain distinguishing data 146 indicating whether the image input to the domain distinguishing section 130 is the generated wide view angle image 142 or the learning wide view angle image 134.

Here, a value associated with either the generated wide view angle image 142 or the learning wide view angle image 134, for example, may be set as the value of the domain distinguishing data 146.

The generation possibility data 144 may, for example, be data assuming a value of zero to one, both inclusive. In this case, the domain distinguishing data 146 may, for example, be data that assumes one as a value in a case where the image input to the domain distinguishing section 130 is the generated wide view angle image 142 and that assumes zero as a value in a case where the image input to the domain distinguishing section 130 is the learning wide view angle image 134.

In addition, the generation possibility data 144 and the domain distinguishing data 146 may, for example, be expressed as a vector including two elements. For example, the value of a first element of the generation possibility data 144 may be a value indicating the level of a possibility that the image input to the domain distinguishing section 130 is the generated wide view angle image 142. In addition, the value of a second element of the generation possibility data 144 may be a value indicating the level of a possibility that the image input to the domain distinguishing section 130 is the learning wide view angle image 134. In this case, the value of the domain distinguishing data 146 associated with the generated wide view angle image 142 may be expressed by a two-dimensional vector (1, 0), and the value of the domain distinguishing data 146 associated with the learning wide view angle image 134 may be expressed by a two-dimensional vector (0, 1).

Then, the present embodiment updates the value of a parameter of either the wide view angle image generating section 128 or the domain distinguishing section 130 by an error back propagation method, for example, on the basis of an error between the generation possibility data 144 and the domain distinguishing data 146.

Here, the learning according to the present embodiment may alternately repeat the updating of the value of the parameter of the wide view angle image generating section 128 using a predetermined number of pieces of third learning data and the updating of the value of the parameter of the domain distinguishing section 130 using a predetermined number of pieces of third learning data. In this case, at the time of updating the value of the parameter of the wide view angle image generating section 128, the value of the parameter of the wide view angle image generating section 128 is updated in a state in which the value of the parameter of the domain distinguishing section 130 is fixed. In addition, at the time of updating the value of the parameter of the domain distinguishing section 130, the value of the parameter of the domain distinguishing section 130 is updated in a state in which the value of the parameter of the wide view angle image generating section 128 is fixed.

The machine learning models implemented in the image processing device 110 are learned as described above.

Figure 11:
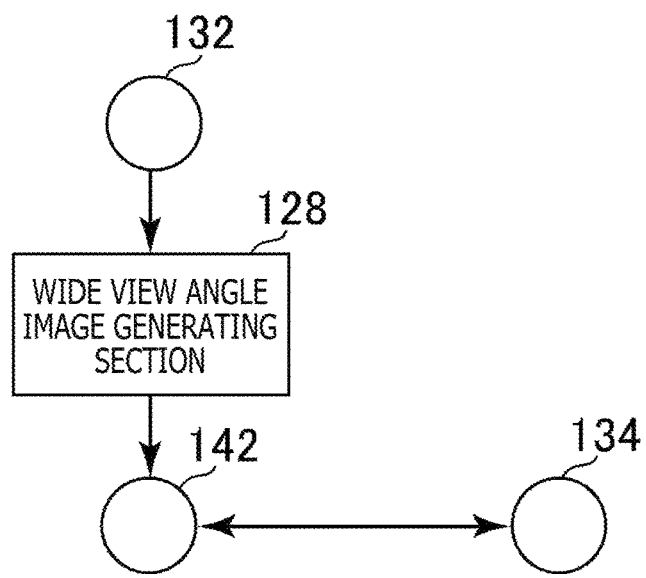
FIG. 11 is a diagram illustrating another example of the learning according to the second embodiment.

It is to be noted that the method of the learning according to the present embodiment is not limited to the above-described method. For example, as illustrated in FIG. 11, the learning according to the present embodiment may be performed without using the GAN technology. In an example of FIG. 11, the learning of the wide view angle image generating section 128 is performed without using the domain distinguishing section 130. The learning wide view angle image 134 included in the third learning data in the learning illustrated in FIG. 11 is an image that is associated with the learning hyperspectral data 132 included in the third learning data, and which is an image photographed at a same position as the learning hyperspectral data 132 included in the third learning data or the like.

In the example of the learning illustrated in FIG. 11, an error (comparison result) is identified between the generated wide view angle image 142 generated on the basis of the learning hyperspectral data 132 included in the third learning data and the learning wide view angle image 134 included in the third learning data. Here, an MAE, an MSE, or an RMSE, for example, may be identified. Then, on the basis of the identified error, the value of the parameter of the wide view angle image generating section 128 is updated by an error back propagation method, for example.

As described above, by using the machine learning model in which learning is performed, and on the basis of hyperspectral data, the present embodiment, for example, generates an image supplemented with an object or a landscape outside the angle of view of the hyperspectral data and having a wider angle of view than the hyperspectral data.

Figure 12:
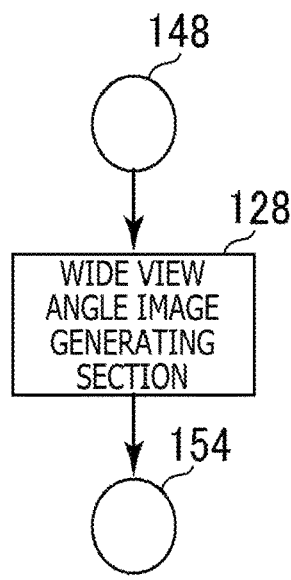
FIG. 12 is a diagram illustrating an example of generation of an image according to the second embodiment.

The generation of an image by using the learned machine learning model will be described in the following with reference to FIG. 12.

First, hyperspectral data photographed by the hyperspectral camera is input to the learned wide view angle image generating section 128. The hyperspectral data will hereinafter be referred to as target hyperspectral data 148. The wide view angle image generating section 128 then generates and outputs an image corresponding to the target hyperspectral data 148. The image generated here is, for example, an image supplemented with an object or a landscape outside the angle of view of the target hyperspectral data 148 and having a wider angle of view than the target hyperspectral data 148. The generated image will hereinafter be referred to as a target wide view angle image 154. The target wide view angle image 154 may be an image with the HDR. The wide view angle image generating section 128 then outputs the generated target wide view angle image 154.

In the present embodiment, as described above, the target hyperspectral data 148 having a larger number of channels than a two-dimensional image photographed by an ordinary camera is input to the wide view angle image generating section 128. The wide view angle image generating section 128 then estimates an environment outside the angle of view of the target hyperspectral data 148 on the basis of the target hyperspectral data 148. The target wide view angle image 154 reflecting a result of the estimation is then output.

Thus, according to the present embodiment, as compared with a case of estimating an environment outside the angle of view of an image photographed by an ordinary camera on the basis of the image, it is possible to improve accuracy of estimation of the environment outside the angle of view of the image. For example, a light source in image based lighting (IBL) may be set on the basis of the target wide view angle image 154 generated by the image processing device 110 according to the present embodiment. It is to be noted that, needless to say, applications of the target wide view angle image 54 generated by the image processing device 110 according to the present embodiment are not limited to IBL.

Functions of the image processing device 110 according to the present embodiment will be further described in the following.

Figure 13:
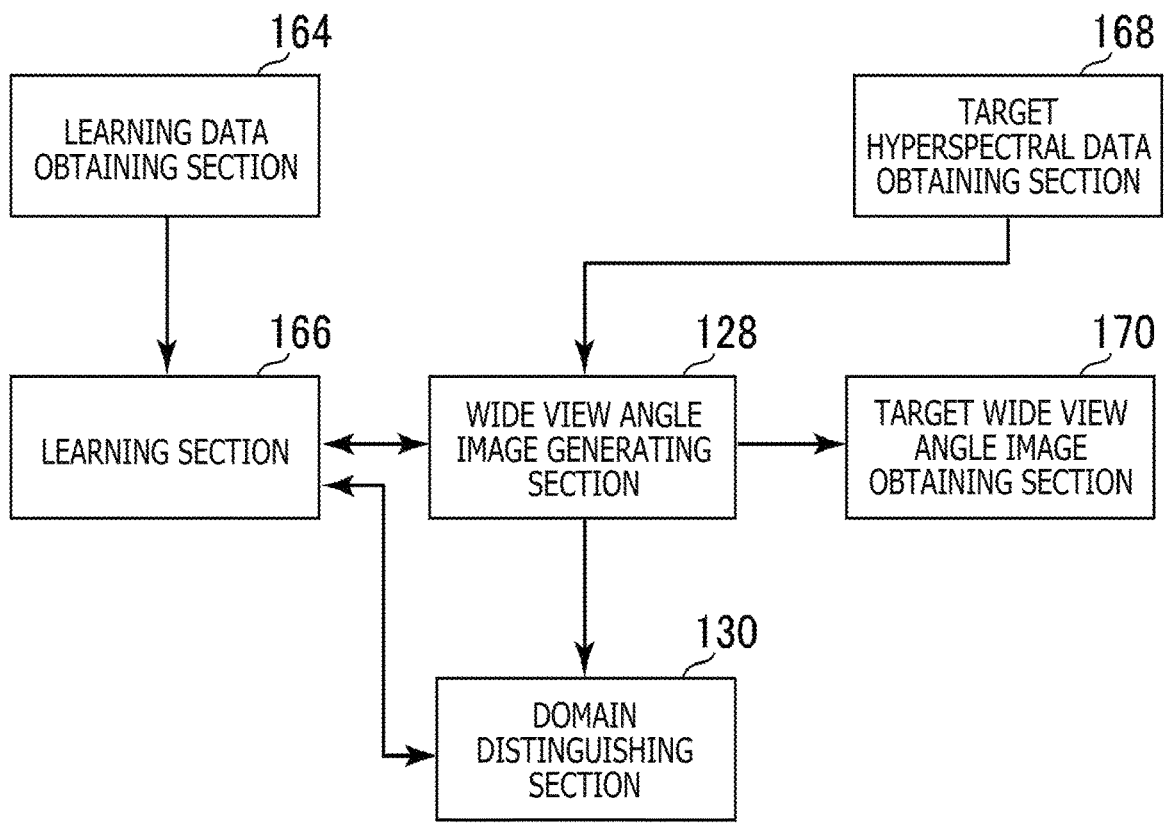
FIG. 13 is a functional block diagram illustrating an example of functions implemented by an image processing device according to the second embodiment.

FIG. 13 is a functional block diagram illustrating an example of functions implemented by the image processing device 110 according to the present embodiment. Incidentally, the image processing device 110 according to the present embodiment does not need to implement all of the functions illustrated in FIG. 13, and may implement a function other than the functions illustrated in FIG. 13.

As illustrated in FIG. 13, the image processing device 110 according to the present embodiment functionally includes, for example, the wide view angle image generating section 128, the domain distinguishing section 130, a learning data obtaining section 164, a learning section 166, a target hyperspectral data obtaining section 168, and a target wide view angle image obtaining section 170. The above elements are implemented mainly by the processor 12 and the storage unit 14.

The above functions may be implemented by the processor 12 by executing a program that is installed on the image processing device 110 as a computer and includes commands corresponding to the above functions. This program may, for example, be supplied to the image processing device 110 via a computer readable information storage medium such as an optical disk, a magnetic disk, a magnetic tape, a magneto-optical disk, or a flash memory or via the Internet or the like.

As described above, in response to input of hyperspectral data, the wide view angle image generating section 128 in the present embodiment, for example, generates an image having a wider angle of view than the hyperspectral data. In addition, as described above, the wide view angle image generating section 128 in the present embodiment, for example, outputs the generated image.

As described above, the domain distinguishing section 130 in the present embodiment, for example, outputs a distinction result indicating whether or not an image input to the domain distinguishing section 130 is the image generated by the wide view angle image generating section 128.

The learning data obtaining section 164 in the present embodiment, for example, obtains the above-described third learning data.

The learning section 166 in the present embodiment, for example, performs the learning according to the present embodiment using the third learning data obtained by the learning data obtaining section 164.

The target hyperspectral data obtaining section 168 in the present embodiment, for example, obtains the above-described target hyperspectral data 148.

The target wide view angle image obtaining section 170 in the present embodiment, for example, obtains the target wide view angle image 154 generated and output by the wide view angle image generating section 128 in response to the input of the target hyperspectral data 148 as described above.

It is to be noted that the present invention is not limited to the foregoing embodiments.

In addition, the above specific character strings and numerical values and the specific character strings and numerical values in the drawings are illustrative, and are not limited to these character strings and numerical values.

The invention claimed is:

1. An image generation device comprising:
a display; and
processing circuitry configured to:
  obtain a target input image having a first angle of view;
  perform semantic segmentation on the target input image to generate result data,
  wherein the semantic segmentation performed on the target input image comprises a learned semantic segmentation that is based on first learning data that comprises a first learning input image and teacher data;
  generate input data obtained by coupling the target input image and the result data to each other;
  perform image generation, in response to the input data, of a second image having a second angle of view wider than the first angle of view; and
  display the second image,
  wherein the image generation performed on the input data comprises a learned image generation that is based on second learned data that comprises a second learning input image and a learning wide view angle image, and
  wherein the second image having the second angle of view is generated based on the target image having the first angle of view and an estimate of an environment outside of the first angle of view of the target image.

2. The image generation device according to claim 1, wherein the processing circuitry configured to is further configured to:
  receive as an input the second image or the learning wide view angle image,
  output generation possibility data indicating a level of possibility that the input to the processing circuitry is the generated wide view angle image,
  compare the generation possibility data to domain distinguishing data to generate comparison data, and
  based on the comparison data, provide
    an update to the processing circuitry to be used as domain distinguishing learning data, or
    an update to the learned image generation that is used for the image generation.

3. A method of image generation performed by an electronic device, the method comprising:
  obtaining a target input image having a first angle of view;
  performing semantic segmentation on the target input image to generate result data,
  wherein the semantic segmentation performed on the target input image comprises a learned semantic segmentation that is based on first learning data that comprises a first learning input image and teacher data;
  generating input data obtained by coupling the target input image and the result data to each other;
  performing image generation, in response to the input data, of a second image having a second angle of view wider than the first angle of view; and
  displaying the second image,
  wherein the image generation performed on the input data comprises a learned image generation that is based on second learned data that comprises a second learning input image and a learning wide view angle image, and
  wherein the second image having the second angle of view is generated based on the target image having the first angle of view and an estimate of an environment outside of the first angle of view of the target image.

4. A non-transitory computer readable medium containing instructions to cause a computer to perform a method of image generation, the method comprising:
  obtaining a target input image having a first angle of view;
  performing semantic segmentation on the target input image to generate result data,
  wherein the semantic segmentation performed on the target input image comprises a learned semantic segmentation that is based on first learning data that comprises a first learning input image and teacher data;
  generating input data obtained by coupling the target input image and the result data to each other;
  performing image generation, in response to the input data, of a second image having a second angle of view wider than the first angle of view; and
  displaying the second image,
  wherein the image generation performed on the input data comprises a learned image generation that is based on second learned data that comprises a second learning input image and a learning wide view angle image, and
  wherein the second image having the second angle of view is generated based on the target image having the first angle of view and an estimate of an environment outside of the first angle of view of the target image.

5. The method according to claim 3, further comprising:
performing a domain distinguishing process that includes:
  receiving as an input the second image or the learning wide view angle image,
  outputting generation possibility data indicating a level of possibility that the input to the domain distinguishing process is the generated wide view angle image,
  comparing the generation possibility data to domain distinguishing data to generate comparison data, and
  based on the comparison data, providing
    an update to the domain distinguishing process to be used as domain distinguishing learning data, or
    an update to the learned image generation that is used for the image generation.

6. The non-transitory computer readable medium according to claim 4, wherein the method further comprises:
performing a domain distinguishing process that includes:
  receiving as an input the second image or the learning wide view angle image, outputting generation possibility data indicating a level of possibility that the input to the domain distinguishing process is the generated wide view angle image, comparing the generation possibility data to domain distinguishing data to generate comparison data, and based on the comparison data, providing
- an update to the domain distinguishing process to be used as domain distinguishing learning data, or
- an update to the learned image generation that is used for the image generation.

7. The image generation device according to claim 1, wherein the target input image is a hyperspectral image, the first learning input image is a first learning input hyperspectral image, the second image is a second hyperspectral image, and the learned image generation is a learned hyperspectral image generation.

8. The method according to claim 3, wherein the target input image is a hyperspectral image, the first learning input image is a first learning input hyperspectral image, the second image is a second hyperspectral image, and the learned image generation is a learned hyperspectral image generation.

9. The non-transitory computer readable medium according to claim 4, wherein the target input image is a hyperspectral image, the first learning input image is a first learning input hyperspectral image, the second image is a second hyperspectral image, and the learned image generation is a learned hyperspectral image generation.

* * * * *